(12) United States Patent
Hartmann

(10) Patent No.: US 6,739,459 B1
(45) Date of Patent: May 25, 2004

(54) FILTER ELEMENT INCLUDING BONDED END CAPS AND SUPPORT CORE

(75) Inventor: Thomas Hartmann, Huntington Station, NY (US)

(73) Assignee: Pall Corporation, East Hills, NY (US)

( * ) Notice: Subject to any disclaimer, the term of this patent is extended or adjusted under 35 U.S.C. 154(b) by 0 days.

(21) Appl. No.: 09/720,196

(22) PCT Filed: Jun. 25, 1999

(86) PCT No.: PCT/US99/14357

§ 371 (c)(1),
(2), (4) Date: Apr. 2, 2001

(87) PCT Pub. No.: WO00/00263

PCT Pub. Date: Jan. 6, 2000

(65) Prior Publication Data (65)

Related U.S. Application Data (60) Provisional application No. 60/090,909, filed on Jun. 26, 1998.

(51) Int. Cl.[7] .............................................. B01D 27/06
(52) U.S. Cl. ................ 210/457; 210/493.2; 210/497.01
(58) Field of Search ................... 210/457, 458, 210/489, 493.2, 497.01; 55/510, 521

(56) References Cited

U.S. PATENT DOCUMENTS

| | | |
|---|---|---|
| 3,002,870 A | 10/1961 | Belgarde et al. |
| 3,457,339 A | 7/1969 | Pall et al. |
| 3,562,078 A | 2/1971 | Zumstein |
| 3,618,196 A | 11/1971 | Slustz |
| 4,228,012 A | 10/1980 | Pall |
| 4,521,309 A | 6/1985 | Pall |
| 4,609,465 A | 9/1986 | Miller |
| 4,865,738 A * | 9/1989 | Black, Jr. et al. ............ 210/484 |
| 4,882,056 A | 11/1989 | Degen et al. |
| 5,039,413 A | 8/1991 | Harwood et al. |
| 5,130,023 A | 7/1992 | Feint |
| 5,225,077 A | 7/1993 | Feint |
| 5,238,717 A | 8/1993 | Boylan |
| 5,252,207 A | 10/1993 | Miller et al. |
| 5,275,743 A | 1/1994 | Miller et al. |
| 5,395,039 A | 3/1995 | Koehler et al. |
| 5,472,537 A | 12/1995 | Friel et al. |
| 5,476,585 A | 12/1995 | Mills |
| 5,543,047 A * | 8/1996 | Stoyell et al. ............ 210/493.2 |
| 5,605,625 A | 2/1997 | Mills |
| 5,647,950 A | 7/1997 | Reed et al. |
| 5,660,771 A | 8/1997 | Dunfee et al. |

FOREIGN PATENT DOCUMENTS

| | | |
|---|---|---|
| EP | 520 737 | 12/1992 |
| EP | 685 251 | 12/1995 |
| EP | 769 317 | 4/1997 |
| JP | 53-72081 | 6/1978 |

* cited by examiner

Primary Examiner—Matthew O. Savage
(74) Attorney, Agent, or Firm—Leydig, Voit & Mayer, Ltd.

(57) ABSTRACT

A filter element includes a hollow filter pack, a core disposed in the filter pack, and an end cap. The core has a wall structure and a recess. The end cap is bonded to the filter, and solidified bonding material produced during bonding of the end cap to the filter pack is contained in the recess of the core. The wall structure of the core supports the periphery of the filter pack at the bond.

29 Claims, 5 Drawing Sheets

FILTER ELEMENT INCLUDING BONDED END CAPS AND SUPPORT CORE

This application claims the priority of U.S. Provisional Patent Application No. 60/090,909, filed Jun. 26, 1998, which application is incorporated by reference in its entirety.

BACKGROUND

A filter element may include a hollow cylindrical filter pack, where a filter pack may be defined as any structure that includes a filter medium. The interior of the filter pack may be supported by an internal core and the exterior of the filter pack may be supported by an external cage. One or both ends of the filter pack are typically bonded to a closure such as an end cap. The end of the filter pack may be bonded to the end cap by any suitable technique which provides sufficient filter integrity, including melt bonding or the use of a potting material, such as an epoxy, a urethane, or a hot melt adhesive.

When a filter pack is bonded to an end cap, an end portion of the end cap may be liquefied, for example, by heating it until the end portion melts, and the filter pack may be inserted into the molten portion. Alternatively, a liquid potting material may be applied to the end cap and the end of the filter pack may be inserted into the potting material. The liquid bonding material, e.g., other the molten portion of the end cap or the potting material, then solidifies or hardens, forming a bond between the filter pack and the end cap.

In a typical melt bonding and/or potting material bonding, the end of the core and/or the end of the cage may be inserted into the liquid bonding material along with the end of the filter pack. Unfortunately, the end of the core and/or cage then displaces a significant amount of the liquid bonding material. This displaced bonding material may be forced into the bonding area between the end cap and the end of the filter pack, resulting in excess bonding material. The excess bonding material may cause improper bonding and compromise the integrity of the bond between the end cap and the end of the filter pack. The excess bonding material may also be drawn deep into the end of the filter pack, where it may damage or blind the filter medium or bond the filter pack to the core.

The liquid bonding material displaced by the end of the core and/or cage may also be forced onto the outer or inner surfaces of the filter element, where it can resolidify as globules or ridges. Not only are these globules or ridges unsightly; they can also interfere with the fit of the filter element into a housing and with the flow of fluid around and through the filter element.

Another problem with conventional cylindrical filter elements is that pressures exerted on the filter pack at the bond during filtration and backwashing or blowback stress the bond between the filter pack and the end cap. Expansion or contraction of the filter pack due to the effects of temperature and/or moisture can also stress the bond between the filter pack and the end cap. Repeated stress on the bond may cause the bond to fail, allowing unfiltered fluid to bypass the filter pack and contaminate fluid that has been treated by the filter element.

SUMMARY OF THE INVENTION

One aspect of the present invention provides a filter element which comprises a hollow filter, a core disposed in the filter, and an end cap. The filter has a first end portion which includes an inner periphery and an inner diameter. The core has a first end portion including a first end and an outer wall structure. The outer wall structure has an outer diameter at the first end of the core corresponding to the inner diameter of the filter. The Core also has a recess at its end. The end cap is bonded to the filter at the first end portion of the filter. Solidified bonding material is disposed in the recess of the core, and the inner periphery of the filter is supported by the outer wall structure of the core near the bond.

Another aspect of the present invention provides a filter element which comprises a hollow filter, a core disposed in the filter, and an end cap. The filter has a first end portion which includes an inner periphery and an inner diameter. The core has first end portion including a first end and an outer wall structure. The outer wall structure has outer diameter corresponding to the inner diameter of the filter. The core also has a recess and an interlock arrangement at its first end. The end cap is bonded to the filter at the first end portion of the filter. Solidified bonding material is disposed in the recess of the core and faces or contacts the interlock arrangement of the core. The inner periphery of the filter is supported by the outer wall structure of the core near the bond.

Another aspect of the present invention provides a filter element which comprises a hollow filter, a core disposed in the filter, and an end cap. The filter has a first end portion, an inner periphery, and an inner diameter. The core has a first end portion including an outer wall structure having outer diameter corresponding to the inner diameter of the filter. The core also has a recess at its first end. The end cap is bonded to the filter at the first end portion of the filter, but the core is not bonded to the end cap. Solidified bonding material is disposed in the recess of the core, and the inner periphery of the filter is supported by the outer wall structure of the core near the bond.

Another aspect of the present invention provides a filter element comprising a hollow filter, a core disposed in the filter, and an end cap. The filter has a first end portion, an inner periphery, and an inner diameter. The core has a first end portion which includes an inner wall structure, an outer wall structure having an outer diameter corresponding to the inner diameter of the filter, and a base which intersects the inner surface of the outer wall structure and the outer surface of the inner wall structure. The core also has a recess at the first end of the core and the recess comprises a groove between the inner wall structure, the outer wall structure, and the base. The end cap is bonded to the filter at the first portion of the filter. Solidified bonding material is disposed in the recess of the core, and the inner periphery of the filter is supported by the outer wall structure near the bond.

Another aspect of the invention provides a filter element which comprising a hollow filter, a core, and an end cap. The filter has a first end portion and an inner periphery, and the core is disposed along the inner periphery of the filter. The core has a first end portion which includes an end face, an outer wall, an inner wall, and a recess. The recess is defined between the outer and inner walls and opens at the end face of the core. The end cap is bonded to the filter at the first end of the filter at the first end portion of the filter, and solidified bonding material is disposed in the recess of the core.

Filter elements embodying the present invention may be made by a method which comprise bonding an end cap to a first end portion of a filter, including solidifying bonding material in a recess of a core. The method also comprises supporting an inner periphery of the filter by an outer wall structure of the core near the bond. Filter elements embodying the present invention may be made by a method which comprises bonding an end cap to a first end portion of a filter, including solidifying bonding material in contact with or facing an interlock arrangement at a first end portion of a core. The method also comprises supporting an inner periphery of the filter with an outer wall structure of the core near the bond.

The embodiments of the invention represent a considerable advance in the state of the art. A filter element or a method which provides for supporting the periphery of a filter by a wall structure of a core at the bond and solidifying bonding material in a recess or in contact with an interlock arrangement provides for several advantages over the prior art. For example, when the end of a filter pack and the end of the core are inserted into the melted region of an end cap or a potting material in an end cap, excess bonding material displaced by the end of the core is not forced into the bonding area nor onto the inner or outer surfaces of the filter element. Rather, the displaced bonding material is contained in the recess and/or around the interlock arrangement of the core, enhancing the integrity if the bond and the effectiveness of the filter element.

In addition, because the filter pack is supported by the outer wall structure of the core at the bond, less stress is placed on the bond between the filter pack and the end cap. Thus, the likelihood of stress failure at the bond and the opportunity for untreated process fluid to leak through a failed bond and contaminate treated fluid are virtually eliminated.

DETAILED DESCRIPTION

Figure 1:
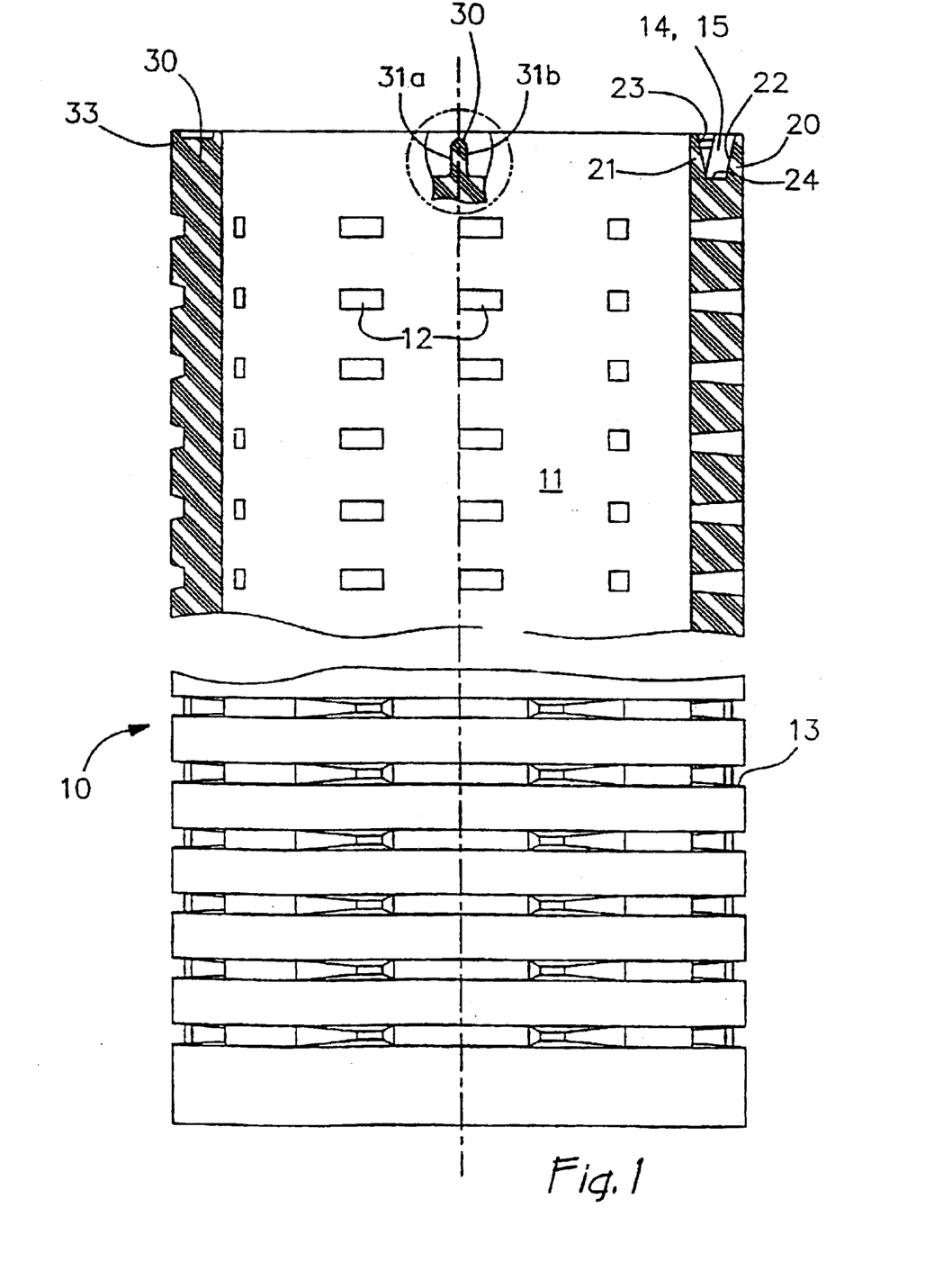
FIG. 1 is aside view of one example of a core partially in cross section.
Figure 2:
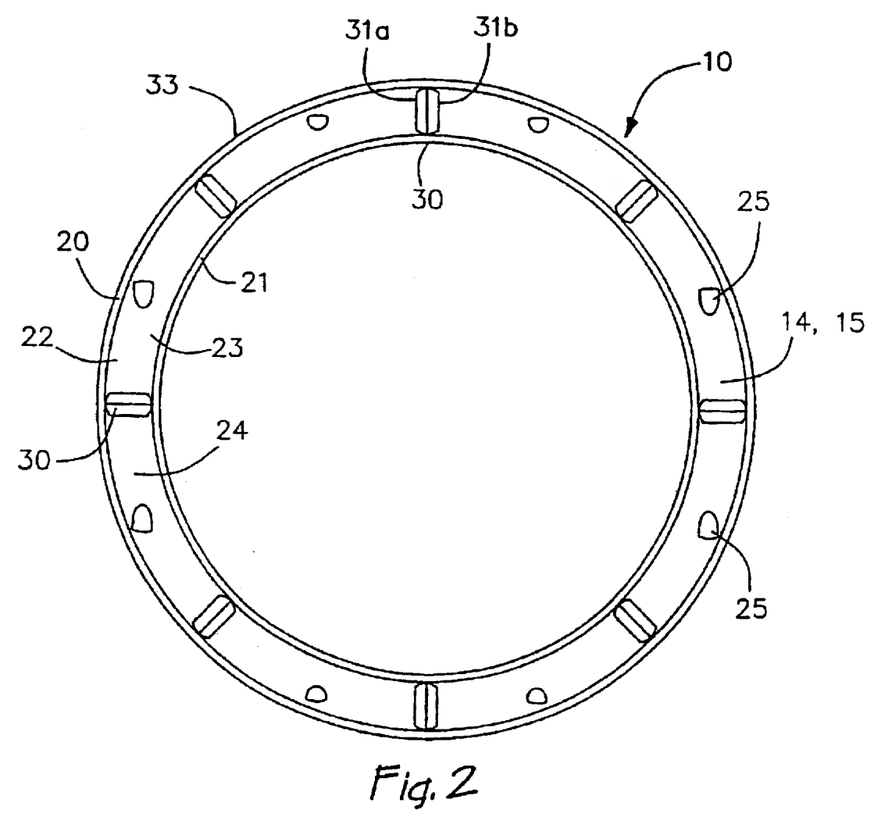
FIG. 2 is a top view of the core in FIG. 1.
Figure 3:
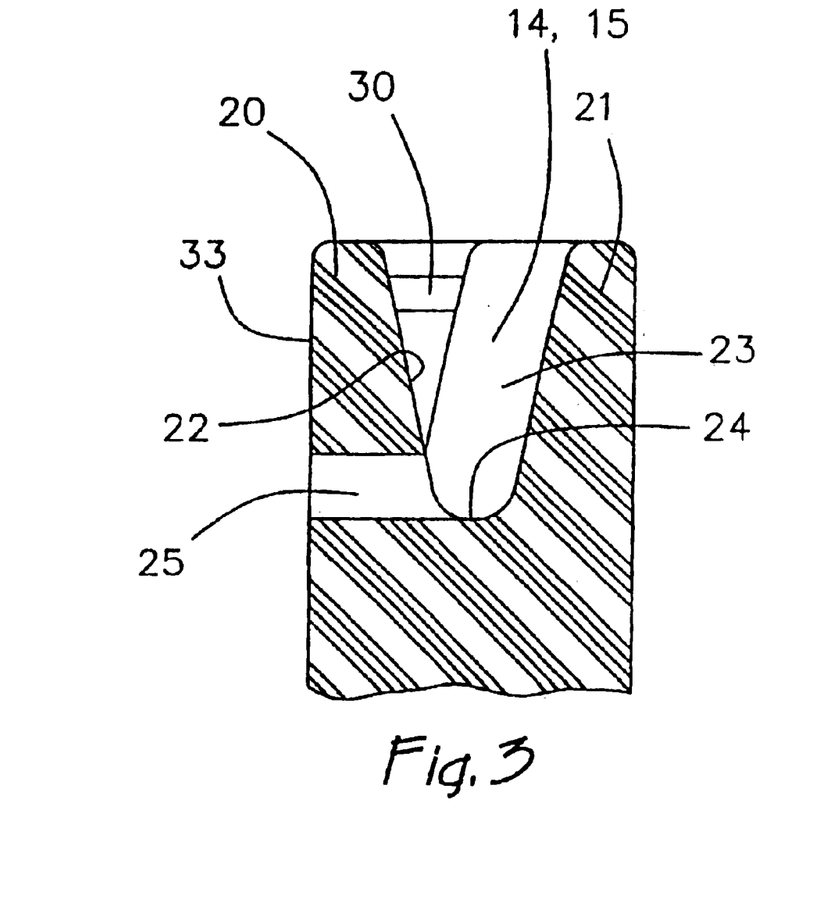
FIG. 3 is a cross sectional view along the recess of the core in FIG. 1.

In some embodiments of the invention, the filter element comprises a core disposed in a hollow filter pack and an end cap bonded to the filter pack. As shown in FIGS. 1–3, the core 10 includes a perforated cylindrical body 11 which may be disposed inside the hollow filter pack to support the filter pack against forces directed radially inwardly through the filter element during filtration and backwashing or blow-back. For example, during filtration process fluid may flow generally radially outside-in through the filter through the apertures 12 in the perforated core 10 to the interior hollow portion of the filter and the core 10 and then axially to an outlet at one or both ends of the core 10. Alternatively, during filtration, process fluid may flow generally radially inside-out from the hollow interior through the apertures 12 in the perforated core 10 to the filter pack.

The core body may be configured in a variety of ways. For example, the core body is preferably cylindrical and has a generally circular cross section, but it may alternatively have a polygonal cross section. The core supports the filter pack against pressurized outside-in flow and prevents the element from collapsing inwardly. Consequently, the core preferably has a configuration similar to the filter and an outer diameter that corresponds to the inner diameter of the filter. The core body may have an even, smooth outer surface except for the apertures or the outer surface may have one or more grooves 13 or other textures to channel fluid to or from the apertures. The apertures may have any shape. For example, the apertures may be circular or rectangular shaped. The apertures are spaced sufficiently apart so that fluid may readily pass between the filter pack and the core with little or no pressure drop.

At least one end, and preferably both ends, of the core 10 include a recess 14 where liquid material, such as waste or extraneous material formed during bonding of the end cap to the filter pack, may be confined. The recess 14 may have any suitable configuration. For example, as shown in FIGS. 1–3, the recess 14 may comprise a groove 15 in the end face at a first end 14 of the core 10. The groove 15 may be defined by an outer wall 20 and an inner wall 21 and may be unbounded on only one side, e.g., the end face of the core 10. Both the outer wall and the inner wall may be the same height or they may have different heights. For example, the inner wall may be shorter than the outer wall. The outer wall and the inner wall may have the same thickness or the thicknesses may differ. For example, the thickness of the outer wall may be greater than the thickness of the inner wall, providing a strong outer wall to support the filter pack. The edges of the inner and outer walls may be flat or inclined and they may be even or textured. The outer wall is preferably continuous while the inner wall may be continuous or discontinuous.

Figure 4:
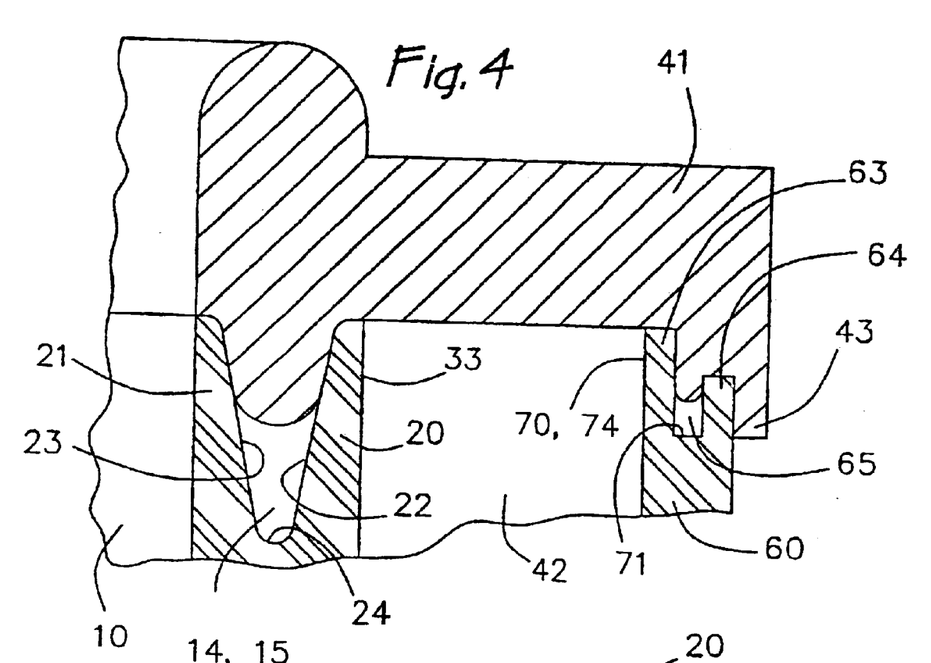
FIG. 4 is a cross sectional view of a portion of a filter element.

As illustrated in FIGS. 1–3, both the outer wall 20 and the inner wall 21 have the same height, and the inner surface 22 of the outer wall 20 and the outer surface 23 of the inner wall 21 are each generally continuous. Further, the inner surface 22 of the outer wall 20 and/or the outer surface 23 of the inner wall 21 may be tapered and define a V-shaped groove 15 having a narrow base 24 at the intersection of the inner and outer surfaces 22, 23. In a preferred embodiment, the outer wall 20 has a narrow edge and a tapered inner surface which neatly divides the liquid material at insertion and directs the liquid bonding material at the end of the core inward away from the bonding area between the end cap and the end of the filter pack. As shown in FIG. 4, the outer wall 20 has an inner surface 22 which tapers continuously in a straight or curved direction radially outwardly from the base to the first free end of the outer wall structure to form a narrowed edge at the first free end of the outer wall. However, the groove may have any suitable shape which is capable of receiving and containing liquid bonding material when the core is inserted into the liquid bonding material. For example, the outer and inner surfaces of the inner and outer walls may extend axially parallel to one another to define a generally U-shaped groove having a relatively wider base.

The recess may include a variety of other features. For example, one or more vents may communicate with the recess and allow gas to escape as liquid bonding material flows into the recess. For example, as shown in FIGS. 1–3, a plurality of vent holes 25 extend through the outer wall 20 of the core 10 near the base 24 of the groove 15. Alternatively or additionally, vents may be located in the inner wall or the base.

An interlock arrangement comprising one or more structures may be formed at one or both ends of the core, preferably in the recess, to aid in die prevention of rotational and/or axial movement of the core relative to the end cap and/or the bonded filter pack. For example, one or more of the inner wall, the outer wall, or the base of the groove may include surface textures, such as bumps, or contoured features, such as indentations, or holes, such as the vents, in or around which the liquid bonding material may solidify. Alternatively, the structures may comprise protrusions, such as partition walls, which extend into the recess and around which the bonding material may solidify. For example, one or more ribs, lands, or walls may protrude into the groove from the outer wall, the inner wall, and/or the base. As shown in FIGS. 1–3, several partition walls 30 protrude radially inward from the inner surface 22 of the outer wall 20. The partition walls 30 preferably extend radially completely across the groove 15 to the inner wall 21 but may terminate prior to the inner wall 21. Further, the partition walls 30 preferably extend axially from the base 24 all the way, or most of the way, to the edge of the outer and/or inner wall 20,22, and the top edge of each partition wall 30 is preferably tapered. Generally, however, the protrusions are not restricted to any particular shape or orientation. The protrusions may protrude from the outer wall, the inner wall, and/or the base in a direction parallel to or at an angle to the radius and/or the axis of the core.

The interlock arrangement may include one or more regular or irregular surfaces which are arranged to contact solidified bonding material to prevent relative movement between the core and the end cap and/or the bonded filter pack in one or more dimensions, e.g., axially or circumferentially (i.e., in the theta direction of a cylindrical coordinate system). In many embodiments, the interlock arrangement may comprise a protrusion or indentation including one or more surfaces which have a significant circumferential projection and which are arranged to prevent relative rotation between the core and the end cap. For example, in the embodiment illustrated in FIGS. 1–3, each partition wall 30 includes opposing surfaces 31a,31b which are arranged to face generally circumferentially and prevent relative rotation between the core and the end cap and/or the bonded filter pack when the surfaces contact solidified bonding material.

At least one end, and preferably both ends, of the core include an outer wall structure which is dimensioned to support the inner periphery of the filter pack in the vicinity of the bond between the filter pack and the end cap. The outer wall structure may be configured in a wide variety of ways. For example, as shown in FIGS. 1–3, the outer wall structure at an end of the core 10 may comprise a continuous outer wall surface 33 having an outer diameter which corresponds to the inner diameter of the inner periphery of the filter pack at the end. A continuous outer wall surface 33 enables the end of the core 10 to completely support the entire inner circumference of the filter pack in the vicinity of the bond between the filter pack and the end cap. Consequently, a continuous outer surface is preferred. However, discontinuities in the outer wall structure maybe provided so long as the inner periphery of the filter pack in the vicinity of the bond between the end cap and the filter pack is substantially supported. Supporting the end of the filter pack in the vicinity of the bond serves to relieve and/or prevent undue stress on the bond during filtration and/or backwashing. As a result, the bond between the filter pack and the end cap is less likely to fail, reducing the likelihood that untreated fluid may bypass the filter pack.

The core may comprise any sufficiently rigid material which is compatible with the fluid to be processed and which has sufficient structural integrity to support the filter pack. For example, the core may be made of a thermoplastic resin, a metal mesh, a perforated sheet of metal such as steel or aluminum, a porous ceramic or any one of a number of porous rigid materials adapted to form a support for a cylindrical filter element. Polymeric materials are preferred. Particularly preferred is a core made of polypropylene or polyethylene. Additionally, the cylindrical body 11 of the core 10 is preferably perforate and includes apertures directing fluid through the cylindrical body 11 to or from the hollow interior of the cylindrical body. However, the cylindrical body may be fashioned from a porous material as, for example, a hollow or solid porous cylinder or from an impervious, imperforate material having channels formed in its outer surface. Each of these cores is preferably arranged to not only support the filter pack but also provide little or no pressure drop for fluid flowing through the filter element.

The core may be fashioned in a wide variety of ways. For example, the core may be injection molded, it may be extruded, or it may be machined. The core may preferably comprise a unitary, one-piece structure. Alternatively, the core may comprise a multiple piece structure, e.g., an integral two or three piece structure in which, for example, the cylindrical body of the core is injection molded and one or two separately molded or machined end pieces containing the grooves and the continuous outer wall surface are fixed to the ends of the body, for example, by welding or bonding. Rather than being fixed to the body, the end pieces may be coupled to the ends of the body in a manner which allows the end pieces to move axially and/or rotationally with respect to the body.

The shape of the filter pack is preferably cylindrical and hollow. The filter pack may be configured in a variety of ways. For example, it may comprise a hollow or solid fibrous mass, or helically wrapped layers of a filter medium and/or a drainage material. Preferred, however, is a hollow, pleated configuration. An example of a suitable pleated configuration for the filter pack may be a cylindrical configuration having a straight radial pleat design. More preferred is a pleated filter having a laid-over configuration, as disclosed, for example, in U.S. Pat. No. 5,543,047, herein incorporated by reference in its entirely.

Various types of filter media may be used with the present invention. The filter media used in the filter element may include any material capable of forming a porous structure suitable for filtering liquids or gases, including porous metal media, porous ceramic media, porous media comprising organic and/or inorganic fibers such as carbon and/or glass fiber media, and/or porous polymeric media. The filter media may include fibrous media such as a mass of fibers, fibrous mats, woven or non-woven fibrous sheets, and fibrous depth filters made by a variety of means including melt blowing, Fourdrinier deposition, or air laying fibrous materials. In addition, the filter media may include a porous film or membrane. The porous filter media of the present invention are not restricted to any particular pore sizes or structures: Microporous and ultraporous media are preferred. Additionally, the filter medium may comprise one of more layers, each layer having the same or different filtering characteristics. For example, the filter medium may comprise two or more layers. One of the layers, preferably an upstream layer, may be more coarse than the other layer, thereby serving as a prefilter.

The filter pack may also contain one or more additional layers such as upstream and/or downstream drainage layers and a cushioning layer. The upstream and downstream drainage layers are disposed on the upstream and downstream surfaces of the filter medium, respectively. The upstream and downstream drainage layers can be made of any materials having suitable edgewise flow characteristics, i.e. suitable resistance to fluid flow through the layer in a direction parallel to its surface. The edgewise flow resistance of the drainage layer is preferably low enough that the pressure drop in the drainage layer is less than the pressure drop across the filter medium, thereby providing an even distribution of fluid along the surface of the filter medium. The drainage layers can be in the form of a mesh or screen or a woven or non-woven porous sheet.

The cushioning layer may be disposed between the filter medium and one or both of the drainage layers. The cushioning layer helps prevent abrasion of the filter medium due to rubbing contact with the drainage layers during pressure fluctuations of the fluid system in which the filter is installed. The cushioning layer is preferably made of a material smoother than the drainage layers and having a higher resistance to abrasion than the filter medium. For example, of a suitable cushioning layer may be a polymeric non-woven fabric.

The filter element may have one or more closures, including end caps such as open end caps, blind end caps, and joiner caps, bonded to the filter pack. The end caps may be fashioned from any suitably impervious material, such as a metallic, ceramic, or polymeric material, which is compatible with the material to be filtered. For example, the end cap material may be a metal such as aluminum, stainless steel, or carbon steel or a ceramic or even a fiber reinforced product such as fiberglass reinforced polypropylene, polyamide, such as nylon, or polyester resin. Preferably, the end cap is made from a polymeric material such as polypropylene, polyamide (e.g., nylon), or a polyester. The end cap need not be made of the same material as the core.

The end caps may be of any desired configuration, appropriate to the requirements of the filter pack and the filter element. Usually, at least one of the end caps will be provided with an aperture to allow flow of filtered fluid from or unfiltered fluid to the interior of the filter element. In many instances, both end caps will be apertured, particularly where a plurality of filter elements are to be connected together at joiner caps to form a long tubular element.

The core, the filter pack, and the end cap may be assembled to form the filter element in a wide variety of ways. For example, the filter pack and the core may be arranged to contact one another such that at least in the vicinity of one end, or preferably both ends, the inner periphery of the filter pack intimately faces or contacts the outer wall structure of the core, the outer wall structure having an outer diameter corresponding to the inner diameter of the filter pack. The end cap may be bonded to the filter pack, the liquid bonding material flowing into and being contained in the recess of the core and/or contacting the interlock arrangement.

The inner periphery of a filter pack may be contacted with the core in a variety of ways. For example, the filter pack may be positioned so that the core may be inserted in the inner hollow portion of the filter pack, or the core may be positioned so that the filter pack may be slid over the core. In the vicinity of one end, preferably both ends, the inner periphery of the filter pack contacts the outer wall structure of the core. The outer wall structure of the core and the inner periphery of the filter pack contact one another when they are in actual physical contact or when they are sufficiently proximate that the core supports the filter pack.

The filter pack may be bonded to an end cap in any suitable manner which prevents fluid bypass. For example, the ends of the filter element may be bonded to the end caps by a potting material, e.g., a bonding agent such as an adhesive, a solvent, an epoxy, a urethane, or a silicone. As another example, the filter element may be bonded to the end cap by melt bonding. Melt bonding and the use of potting material are preferred methods, but less preferred methods include spin welding and sonic welding.

In melt bonding, a thermoplastic end cap may be heated to liquefy one entire surface or more preferably a region, such as an annular region, of one surface of the end cap, forming a softened or molten plastic. One end of the filter pack and core may be placed into the liquefied plastic of the end cap, where the liquid plastic flows into the interstices of the filter pack. When the plastic solidifies, the filter pack is securely joined to the end cap. A conventional melt bonding method is disclosed in U.S. Pat. No. 3,457,339, herein incorporated by reference in its entirely.

In potting, a potting material is placed on one surface or in a cavity of the end cap, a potting material being a material that is liquid under filter pack assembly conditions but solid or firm under normal operating conditions. Typically this may be a hot melt adhesive, a molten polymer, a plastisol, an epoxy resin, a wax, a urethane, a silicone, a liquid polymer or elastomer that can quickly be cured to a solid or firm state, or some such similar material. One end of the filter pack and core may be placed in the potting material on the end cap, where the potting material flows into the interstices of the filter pack. When the potting material solidifies, e.g., hardens or firms up, the filter pack is securely joined to the end cap, sealing the end of the filter pack to the end cap.

When the end of the filter pack and the end of the core are inserted into the liquid bonding material, e.g., the molten portion or the end cap or the potting material, the liquid bonding material displaced by the end of the core is preferably not forced into the bonding area between the end of the filter pack and the end cap. Rather, liquid bonding material displaced by the end of the core is directed to and contained in the recess and/or around the interlock arrangement at the end of the core. In particular, the narrow edge of the outer wall of the core slices into, divides and separates the liquid bonding material at the end of the filter pack from the liquid bonding material at the end of the core. The inner surface of the outer wall, especially a tapered inner surface, directs the liquid bonding material at the end of the core away from the bonding area between the end of the filter pack and the end cap. Thus, the liquid bonding material at the end of the core is not forced into the bonding area, where as excess bonding material it can compromise the integrity of the bond between the filter pack and the end cap. Nor is it forced far up into the filter pack or between the filter pack and the core where it can damage or blind the filter medium or bond the core directly to the filter pack. Rather, the liquid bonding material at the end of the core is directed into the recess and/or around the interlock arrangement at the end of the core, where it is contained. Gas, such as air, in the recess may be vented through the vents, e.g., the vent holes, as the liquid bonding material flows into the recess. Once the liquid bonding material solidifies, not only is the filter pack securely bonded to the end cap but the bonding material displaced by the core material is neatly confined in the recess and/or around the interlock arrangement. By confining the bonding material at the end of the core, little or none of the bonding material solidifies as globules or ridges on the inner surfaces of the end cap or the inner surfaces of the body of the core.

As described above, the ends of the filter pack and the core are preferably simultaneously inserted into the molten plastic of the end cap or into the liquid potting material. Alternatively, the end of the filter pack and core may be positioned adjacent to the end cap, and then the end cap may be heated or the liquid potting material may be applied to the end cap and the filter pack. In another alternative, the end of the filter pack may be inserted into the molten plastic of the end cap or into the liquid potting material, and then the core may be inserted into the hollow interior of the filter pack and into the molten plastic of the end cap or the liquid potting material. In still another alternative, the end of the filter pack may be positioned adjacent to the end cap the end cap may be heated or the liquid potting material may be applied to the end cap and the filter pack, and then the core may be inserted into the hollow interior of the filter pack and into the molten plastic of the end cap or the liquid potting material. In each case, the inner periphery of the filter pack is supported by the core in the vicinity of at least one end, and the filter pack is bonded to the end cap. Any liquid bonding material at the end of the core will flow into the recess of the core and/or around the interlock arrangement, where it is contained, and gas may be vented through the vent holes.

In the embodiment of the filter element illustrated in FIG. 4, liquid bonding material produced during the bonding of the end cap 41 to the filter pack 42 was directed into the recess of the core 10, i.e., the groove 15 by the outer and inner walls 20, 21 of core 10. Vent holes 25 communicating with groove 15 allowed air to vent from the groove 15 as the liquid material at the end of the core 10 entered the groove 15. When bonding material 40 cooled or hardened, it solidified and was confined in the recess of the core 10 and around the partition walls 30.

The size of the recess, e.g., the height and/or width of the groove, may vary depending on many factors, including the volume of the bonding material to be contained in the recess. This, in turn, depends, for example, on the bonding technique used to join the end cap to the filter pack. In spin welding, very little melt is produced and much of it is forced radially outwardly due to centrifical force. Consequently, the recess of the core may be sized relatively small to accommodate the relatively small volume of material. In potting, the volume of potting material applied to the end cap and the filter pack may be closely controlled. Consequently, the recess of the core may be intermediately sized to accommodate a small to intermediate volume of bonding material. In melt bonding, the volume of molten plastic produced is more variable. Consequently, the recess of the core may be sized relatively large to accommodate a potentially large volume of bonding material. Regardless of the bonding technique, the recess may be oversized for the volume of bonding material available to the recess, allowing the bonding material to be more fully contained within the recess. Alternatively, the recess may be undersized for the volume of bonding material available to the recess, allowing the bonding material to more fully contact the interlock arrangement, for example, by forcing the bonding material into and through holes, such as the vents. For example, the volume of the recess may be R times the volume of the bonding material available to the recess, where R is any rational number less than or equal to about 5 and greater than or equal to about 5. Thus, the volume of the recess may be about 5 or about 3 or about 2 or about 1.5 or about 0.75 times the volume of bonding material available to the recess.

In each of the embodiments of the invention, at least one end, and preferably both ends, of the filter pack are bonded to the end cap in a manner that fixes and substantially seals the filter pack to the end cap. The core, on the other hand, may be arranged with the end cap either in a manner which fixes the core to the end cap or in a manner which allows the core to move or float relative to the end cap in one or more dimensions, e.g., axially or circumferentially.

The end of the core may be fixed to the end cap at the same time, or at a different time, and in the same manner, or in a different manner, that the end of the filter pack is fixed to the end cap. For example, the core may be made of a material which is similar to or which has a lower melting point than the end cap. Inserting the end of the core into the molten plastic of the end cap, either before or after but preferably as the end of the filter pack is inserted into the molten plastic, may cause portions of the end of the core to melt. Thin portions of the core, such as thin walls, tips, or other thin core structures, are particularly prone to melting. When the melt, including both molten end cap and molten core portions, solidifies, the core, filter pack, and end cap may all be fixed to one another.

Alternatively, the core and the end cap may be fixed to one another by a potting material which bonds the core and the end cap. Again, the end of the core may be inserted into the potting material either before or after but preferably as the end of the filter pack is inserted into the potting material. When the potting material solidifies, hardens, or otherwise firms up, the core, filter pack, and end cap may all be fixed to one another.

The interlock arrangement, such as the partition walls 30, may supplement the fixed bond between the end cap and the core. For example, the partition walls 30 may each include a generally circumferentially facing surface, preferably a pair of oppositely disposed circumferentially facing surfaces 31a, 31b. As the liquid bonding material at the end of the core 10 flows into the recess, it flows along the partition walls 30 adjacent to the opposite circumferentially facing surfaces 31a, 31b. When the bonding material 40 solidifies, it forms correspondingly circumferentially facing surfaces intimately facing or contacting the circumferentially facing surfaces 31a,31b of the partition walls 30. Thus, these facing and/or abutting surfaces of the partition walls 30 and the solidified bonding material are not only bonded to one another but are also arranged to mechanically resist any rotational movement of the end cap clockwise or counter clockwise with respect to the core.

Instead of being fixed to the end cap, the core may not be bonded to the end cap but may be arranged with the end cap in a manner which allows the core to move or float with respect to the end cap in one or more dimensions. This may be preferable where the filter pack has a different coefficient of expansion than the core. For example, a nylon filter medium expands axially due to the effects of moisture and/or temperature much more than a polypropylene core. This expansion is most pronounced in a densely pleated filter pack, such as a filter pack having a laid-over configuration. If the filter pack and the polypropylene core are both fixed to the end cap, the nylon filter medium may buckle outwardly as it expands, stressing the bond between the end cap and the filter pack. Consequently, it is frequently preferable to fix the filter pack to the end caps but allow the core to float axially with respect to one or both end caps.

While it may be preferable to allow the core to float axially with respect to one or both end caps, it is frequently desirable to prevent relative rotational movement between the core and the end caps. For example, one end cap, often the open end cap, may include a fitting which mechanically interlocks the filter element with the housing. The fitting is rotated by grasping the opposite end cap, often the blind end cap, and twisting it one direction or the other. Torque is preferably transmitted from the blind end cap to the open end cap along the core rather than along the filter pack. Transmitting torque along the filter pack can stress the bond at one or both end caps and potentially compromise the integrity of the seal between filter pack and the end caps. To provide for torque transmittal along the core, the core and the end caps are preferably arranged to prevent relative rotation between them.

Thus, the core may be arranged with one or both end caps to float axially but not circumferentially. For example, the core may be made of a material which has a higher melting point than the end cap. Inserting the core into the molten plastic of the end cap does not melt any portion of the core. Consequently, when the melt solidifies, the core and the end cap may not be bonded to one another. Alternatively, the core may be made of a material that does not bond to the potting material. Inserting the core into the potting material and allowing the potting material to solidify may not bond the core to the end cap.

Further, as shown in FIGS. 1–3, the core may also include an interlock arrangement having opposite circumferentially facing surfaces 31a,31b but no undercut axially facing surfaces. Not only is the core then not bonded to the end cap, but the interlock arrangement does not prevent axial movement of the core with respect to the end cap or the filter pack, because the interlock mechanism does not have any undercut axially facing surfaces which could abut solidified bonding material and mechanically prevent axial movement between the core and the end cap. Consequently the core is free to slide axially with respect to the end cap(s) and the filter pack. However, the core aid the end cap rotate together because the solidified bonding material abuts the oppositely disposed circumferentially facing surfaces 31a,31b of the interlock arrangement, mechanically preventing any clockwise or counterclockwise movement of the end cap or filter pack with respect to the core. Torque may then be conveniently transmitted from one end cap along the core to the opposite end cap.

Figure 5:
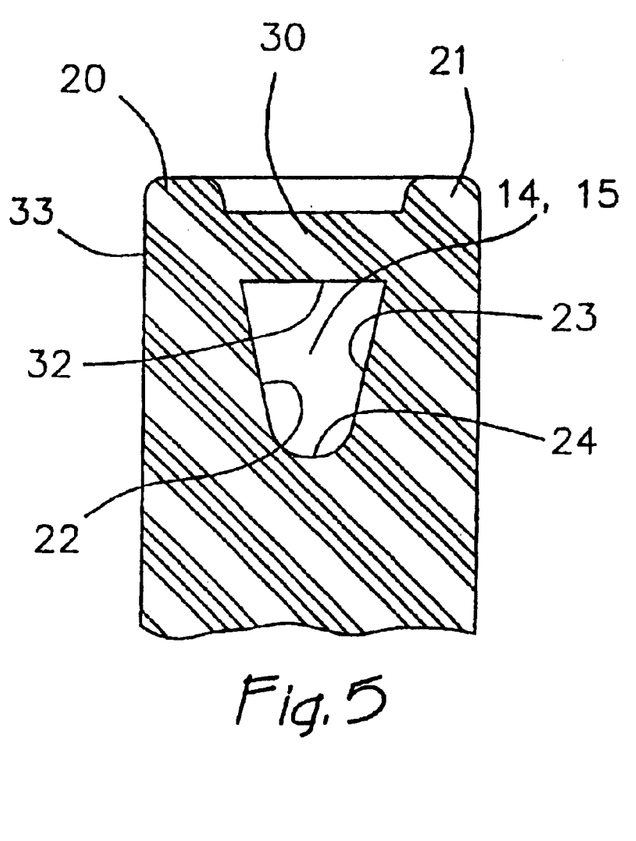
FIG. 5 is a cross sectional view along a recess of a second example of a core.

In alternative embodiments, the interlock arrangement may include one or more undercut surfaces having a significant axial projection as well as circumferentially facing surfaces. For example, as shown in FIG. 5, the partition walls 30 may each include a generally axially facing undercut surface 32 in addition to the oppositely facing circumferential surfaces 31a,31b. As the liquid bonding material at the end of the core 10 flows into the recess it also flows along and under the partition walls 30 adjacent to the opposite circumferentially facing surfaces 31a,31b and the axially facing undercut surface 32. When the bonding material solidifies, it forms corresponding circumferentially facing surfaces and axially facing surfaces intimately facing or contacting the circumferentially facing surfaces 31a,31b and the axially facing surface 32, respectively, of the partition wall 30. The axially facing and abutting surfaces of the partition walls 30 and the solidified bonding material mechanically resist any movement of the end cap away from the core while the circumferentially facing and abutting surfaces mechanically resist any rotational movement of the end cap with respect to the core.

In other alternative embodiments, the interlock arrangement may include one or more undercut axially facing surfaces but no circumferentially facing surfaces. If the core does not bond to the end cap, the end cap and the filter pack may then be able to move circumferentially but not axially with respect to the core. In other embodiments, the core may not include any interlocking arrangement. If the core does not bond to the end cap, the end cap and filter pack may then be free to move both circumferentially and axially with respect to the core. In still other embodiments the vents may function as the interlock arrangement and restrict axial and/or rotational movement of the core with respect to the filter pack and the end cap. Liquid overflow material may flow into and completely or partially fill the vents. When the overflow material solidifies, the solidified overflow material may abut any axially facing surfaces and/or circumferentially facing surfaces of the vents, restricting the axial and rotational movement of the core relative to the filter pack and the end cap.

Although the core may be arranged to float, e.g., axially, with respect to one or both end caps, the core, the end cap(s), and the filter pack are preferably arranged such that the outer wall structure of the core always supports the filter pack at the bond. This may be accomplished in any suitable manner. For example, the end of the core and the end of the filter pack may be offset such that the end of the core extends beyond the end of the filter pack. The offset distance may be designed to be greater than the maximum distance that the core is expected to float away from the end cap. Alternatively, or additionally, the depth of the bond (i.e., the depth that the filter pack is inserted into the molten plastic or the potting material) may be designed to be greater than the maximum distance that the core is expect to float away from the end cap. In any event, as the core floats axially with respect to the end cap, the outer wall structure of the core preferably always supports the filter pack at the bond with the end cap against the inwardly directed forces of the process fluid.

While the overflow recess shown in FIGS. 1–3 comprises a groove 15 defined by outer and inner walls 20, 21, the overflow recess may be differently configured. For example, the overflow recess shown in FIG. 6 comprises an annular space 16 defined by an outer wall 20 and a base 24 of the core 10. The inner surface 22 of the outer wall 20, which may extend parallel to the axis of the core, has an inner diameter greater than the minimum inner diameter of the interior of the core 10, e.g., the inner diameter of the body of the core. However, the inner wall is eliminated and the space 16 is unbounded on two sides, e.g., at the end face and radially inwardly. Otherwise, features of the core 10, including the outer wall 20 and the interlock arrangement, may be identical to many of the embodiments of the core previously described.

Figure 6:
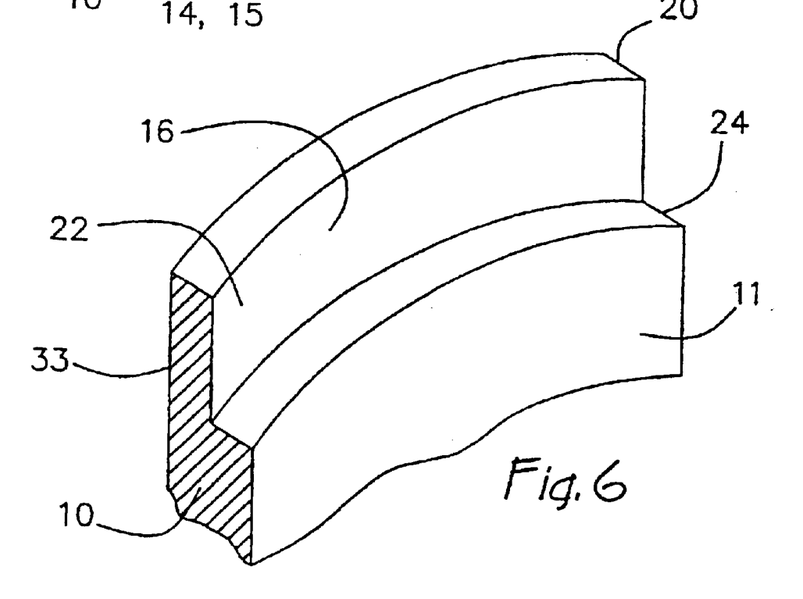
FIG. 6 is an isometric cross sectional view along a recess of a third example of a core.

The method for applying the core 10 of FIG. 6 to an end cap may be similar to the method of applying any of the previous embodiments of the core to an end cap. However, when the core 10 of FIG. 6 is arranged against the end cap, e.g., inserted into the molten plastic or the potting material, a retainer post is preferably disposed inside the core 10. The retainer post preferably has an outer diameter substantially equal to the inner diameter of the core 10 at the open edge of the base 24. The retainer post may extend axially to or beyond the end of the outer wall 20 and may be formed from a material which does not bond to the end cap or the potting material. Consequently, the retainer post prevents the bonding material from flowing radially inside the edge of the base 24, maintaining the bonding material within the recess. However, the retainer post may be conveniently removed after the bonding material solidifies.

The present invention has been described in terms of several exemplary embodiments which include a core. The filter element may also include a cage disposed around the exterior of the filter pack. Thus, the filter element may comprise a hollow fiber unit where the filter pack includes a plurality of hollow fibers extending from one or more end elements. A cage may be joined to the end element(s) and disposed around the hollow fiber filter pack to protect the hollow fibers.

A cage to protect the filter pack during handling and to support the filter pack against forces directed inside-out through the filter element during filteration and backwashing or blowback. The cage, which may be thinner than the core, nonetheless may include a perforated cage body and at one or both ends of the cage an inner wall, an outer wall and a recess between the inner wall and the outer wall. The inner and outer walls of the cage are analogous to the previously described outer and inner walls, respectively, of the core, and the features previously described with respect to the core may also be features of the cage, with this reversal in geometry. For example, the inner wall of the cage includes an inner wall structure which is dimensioned to support the outer periphery of the filter pack in the vicinity of the bond between the filter pack and the end cap. The outer wall of a cage may have a height less than or equal to the height of the inner wall. The recess of the cage may have a suitable shape between the inner and outer walls, including a V- or U-shaped configuration. Further, the cage may include an interlock arrangement and/or vents at one or both ends of the cage, preferably in the recess. The cage may be bonded to the end cap(s) as preciously described with respect to the core, and the cage may be mechanically fixed to the end cap(s) or may be formed from any of the materials using any of the techniques previously described with respect to the core. Thus, filter elements embodying the present invention may also comprise a cage disposed around a hollow filter pack and an end cap bonded to the filter pack.

One example of a cage 60 is shown in FIGS. 4, 7a, 7b, and 7c. The cage 60 includes a cylindrical perforated polymeric body 61 having apertures 62. At least one end, and preferably both ends, of the cage 60 include an inner wall 63, an outer wall 64, and a recess 65 between the inner and outer walls. The inner wall 63 includes an inner wall structure 70, and the outer wall 64 is preferably less high than the inner wall 63. The recess 65 preferably has a U-shaped configuration defined between the inner wall 63, the outer wall 64 and a base 71.

Figure 7A:
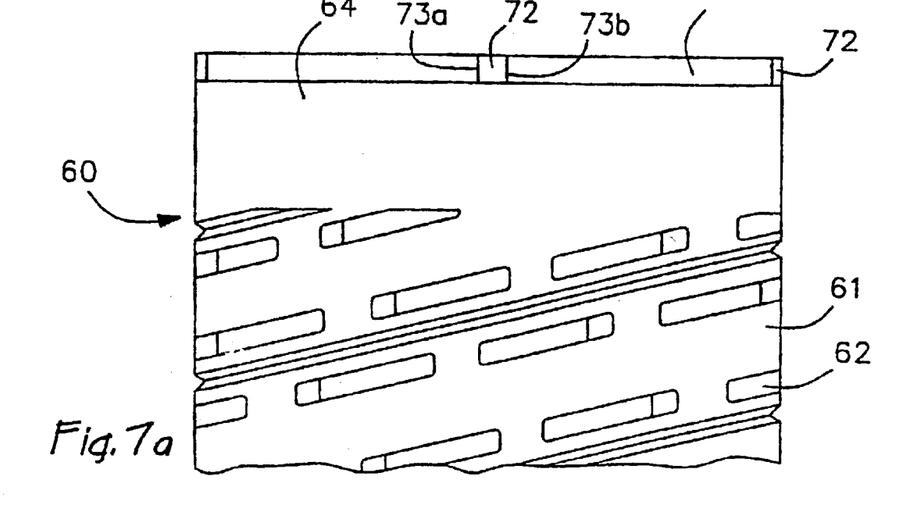
FIGS. 7a and 7b are side and top views of one example of a cage.
Figures 7B, 7C:
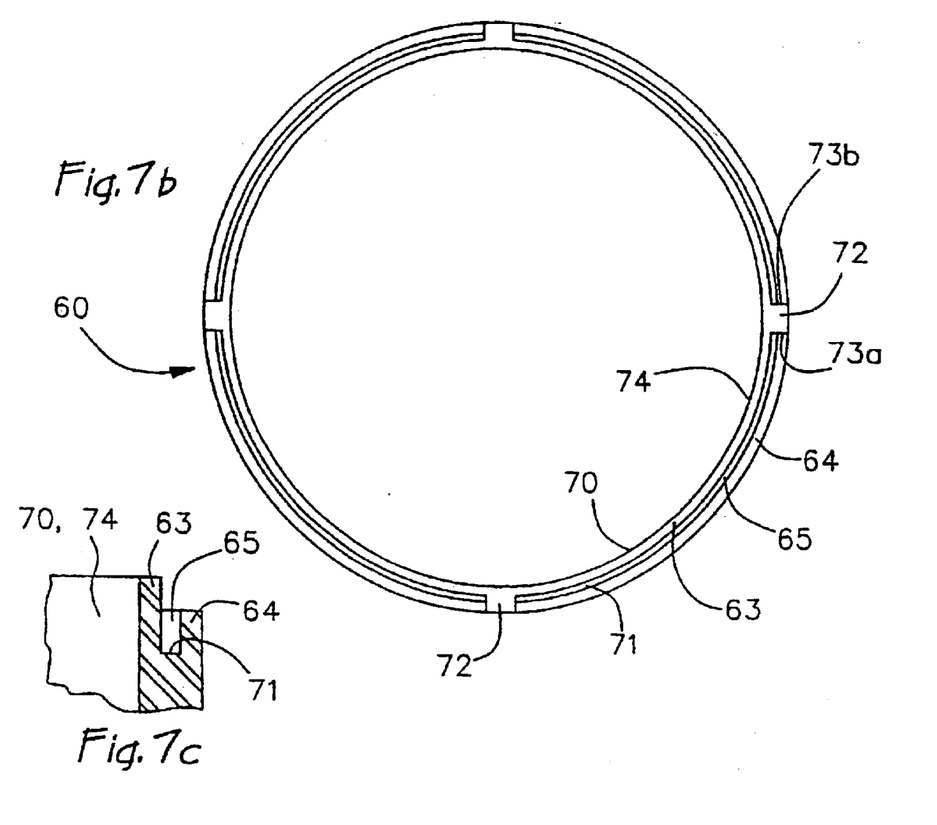
FIG. 7c is a cross sectional view along the recess of the cage of FIGS. 7a and 7b.

The cage 60 further comprises an interlock arrangement which includes one or more ribs or lands 72. The ribs 72 extend radially outwardly from the inner wall 63 to the outer wall 64 and axially from the top of the inner wall 63 to the base 71. Thus, each rib has oppositely disposed circumferentially facing surfaces 73a,73b but preferably no undercut axially facing surface. The inner wall structure of the cage 60 preferably comprises a continuous inner wall surface 74 having an inner diameter which corresponds to the outer diameter of the outer periphery of the filter pack in the vicinity of the end.

The cage, the filter pack, and the end cap may be assembled to form a filter element according to any of the techniques previously described with respect to the core, the filter pack, and the end cap. For example, the cage and the filter pack may be arranged to contact one another such that at least in the vicinity of one end, and preferably both ends, the inner wall structure of the cage supports and/or contacts the outer periphery of the filter pack. The end of the filter pack and the end of the cage may be inserted into the liquid bonding material. The liquid bonding material displaced by the end of the cage is not forced into the bonding area between the end of the filter pack and the end cap as excess bonding material. Rather, the narrow edge of the inner wall of the cage slices into, divides, and separates the liquid bonding material at the end of the filter pack from the liquid bonding material at the end of the cage. The outer surface of the inner wall directs the liquid bonding material away from the bonding area, neatly confining it in the recess and/or around the interlock arrangement. The cage may be arranged with the end cap either in a manner which fixes the cage to the end cap or in a manner which allows the cage to move or float relative to the end cap in one or more dimensions, e.g., axially or circumferentially. In particular, fixing the cage at least mechanically to prevent relative rotation between the cage and the end cap allows torque to be transmitted from one end cap to the other via the cage.

In the embodiment of the filter element illustrated in FIG. 4, the liquid bonding material was directed into the recess 65 and around the ribs 72. When the bonding material 40 solidified, it was confined in the recess and formed circumferentially facing surfaces intimately facing or contacting the circumferentially facing surfaces of the ribs 72. Preferably, the nature of the bonding material and the cage is such that the cage does not bond to the bonding material. The circumferentially facing surfaces of the solidified bonding material and the ribs abut one another and mechanically resist any rotational movement of the end cap clockwise or counterclockwise with respect to the cage, but the cage is free to float axially with respect to the end cap. An outer flange section 43 of the end cap 41 may be provided. The flange 43 and the outer wall 65 prevent the bonding material from flowing radially outside the cage 60. Preferably, the flange section 43 is not removed after the bonding material solidifies and remains as a portion of the end cap 41.

Filter elements embodying the invention may include a core but no cage. Many embodiments, however, preferably include both a cage and a core. With the inner wall structure of the cage and the outer wall structure of the core completely supporting the end(s) of the filter pack for 360°, a highly uniform pack end is presented to the liquid bonding material. Further, none of the liquid bonding material at the end of the cage or the end of the core is directed into the bonding area as excess bonding material, enhancing the integrity of the bond between the end of the filter pack and the end cap.

Although the present invention has been described in terms of exemplary embodiments, it is not limited to these embodiments. For example, in bonding the end of the filter pack to the end cap, tooling may be substituted for the cage. In one embodiment, an outer cylindrical tool may be slid along the exterior of the filter pack. The outer cylindrical tool may have an inner wall structure having a narrow edge and an inner diameter corresponding to the outer diameter of the filter pack. The end of the filter pack and the narrow edge of the outer cylindrical tool may be inserted into the liquid bonding material, where a narrow edge of the outer cylindrical tool slices into, divides, and separate the liquid bonding material. Liquid bonding material the end of the outer cylindrical tool is thus directed away from the bonding area by the narrow edge of the cylindrical tool, preventing excess bonding material from being forced into the bonding area. The cylindrical tool is preferably formed from a material that does not bond the liquid bonding material or to the end cap. Consequently, once the liquid bonding material solidifies, the cylindrical tool may be removed, leaving a high integrity bond between the filter pack and the end cap.

Clearly, alternative embodiments, examples, and modifications which would still be encompassed by the invention may be made by, those skilled in the art, particularly in light of the foregoing teachings. For example, the present invention encompasses the combination of one or more features of any of the embodiments previously described or illustrated with the features of the other embodiments. The present invention also encompasses any of the embodiments previously described or illustrated where one or more features of the embodiment are modified or deleted. Therefore, the following claims are intended to cover any alternative embodiments, examples, modifications, or equivalents which may be included within the spirit and scope of the invention as defined by the claims.

What is claimed is:

1. A filter element comprising:
   a hollow filter, wherein the filter has a first end portion including an inner periphery and an inner diameter;
   a core disposed in the filter, the core coaxially surrounding a central axis and having a first end portion including a base oriented generally perpendicular to said axis and a radially outer wall structure which extends axially from said base to a first free end, wherein said outer wall structure contacts the filter and defines a radially inner surface, wherein said base and said inner surface together form a recess at the first end portion of the core, and wherein said inner surface tapers continuously in a straight or curved direction radially outwardly from said base to the first free end of the outer wall structure to form a narrowed edge at the first free end of the outer wall structure; and
   an end cap bonded to the filter at the first end portion of the filter, wherein solidified bonding material is disposed in the recess of the core and wherein the inner periphery of the filter is supported near the bond by the outer wall structure of the core.

2. The filter element of claim 1 wherein the core further includes an interlock arrangement at the first end portion of the core.

3. The filter element of claim 2, wherein the interlock arrangement is formed in the recess.

4. The filter element of claim 3, wherein the interlock arrangement includes partition walls.

5. The filter element of claim 2, wherein the interlock arrangement is arranged to prevent relative movement between the end cap and the core in the circumferential direction.

6. The filter element of claim 2, wherein the interlock arrangement supplements a fixed bond between the end cap and the core.

7. The filter element of claim 2, wherein the interlock arrangement includes partition walls, and facing or abutting surfaces of the partition walls and solidified bonding material are arranged to mechanically resist rotational movement but allow axial movement of the end cap with respect to the core.

8. The filter element of claim 1 wherein the core comprises a unitary, one-piece structure.

9. The filter element of claim 1 wherein the core is fixed to the end cap.

10. The filter element of claim 1 wherein the first end portion of the core further includes an inner wall structure, the recess comprising a groove defined by the outer wall structure and the inner wall structure.

11. The filter element of claim 1 wherein the core is bonded to the end cap.

12. The filter element of claim 1, wherein the inner periphery of the filter contacts the outer wall structure of the core.

13. The filter element of claim 1, wherein the filter includes a first material, and the core includes a second material, wherein the first material expands at a greater rate than the second material.

14. The filter element of claim 1, wherein the filter has a laid over pleat configuration.

15. The filter element of claim 1 wherein the outer wall structure of the core surrounds the recess and has a generally continuous outer surface, and a generally continuous inner surface.

16. The filter element of claim 1 wherein the inner surface of the outer wall structure tapers from the edge away from the outer surface.

17. A filter element comprising:
    a hollow filter, wherein the filter has a first end portion, an inner periphery, and an inner diameter;
    a core disposed in the filter, the core coaxially surrounding a central axis and having a first end portion including a base oriented generally perpendicular to said axis and an outer wall structure which extends axially from said base to a first free ends, wherein said outer wall structure contacts the filter and defines a radially inner surface, wherein said base and said inner surface together define a recess at the first end portion of the core and wherein said inner surface tapers continuously in a straight or curved direction radially outwardly from said base to the first free end of the outer wall structure to form a narrowed edge at the first free end of the outer wall structure; and
    an end cap bonded to the filter at the first end portion of the filter, wherein the core is not bonded to the end cap, wherein solidified bonding material is disposed in the recess of the core and wherein the inner periphery of the filter is supported near the bond by the outer wall structure of the core.

18. The filter element of claim 1 wherein the outer wall structure is continuous and disposed around the recess.

19. A filter element comprising:
    a hollow filter, wherein the filter has a first end portion, an inner periphery, and an inner diameter;
    a core disposed in the filter, the core coaxially surrounding a central axis and having a first end portion including an inner wall structure, an outer wall structure which contacts the filter, and a base oriented generally perpendicular to said axis which intersects a radially inner surface of the outer wall structure and a radially outer surface of the inner wall structure, said radially inner surface and said radially outer surface and said base together defining a recess at the first end portion of the core, the recess comprising a groove between the inner wall structure, the outer wall structure, and the base, wherein said inner surface of the outer wall structure tapers continuously in a straight or curved direction radially outwardly from said base to a first free end of the outer wall structure to form a narrowed edge at the first free end of the outer wall structure; and
    an end cap bonded to the filter at the first end portion of the filter, wherein solidified bonding material is disposed in the recess of the core and wherein the inner periphery of the filter is supported near the bond by the outer wall structure of the core.

20. The filter element of claim 1 wherein the first end portion of the core further includes vents communicating with the recess.

21. The filter element of claim 20 wherein the vents include holes extending through the outer wall structure.

22. The filter element of claim 19, wherein the first end portion of the core further includes an interlock arrangement, wherein the interlock arrangement includes partition walls which extend radially completely across the groove between the inner wall structure and the outer wall structure.

23. A filter element comprising:

a hollow filter, wherein the filter has a first end portion and an inner periphery;

a core disposed along the inner periphery of the filter, the core coaxially surrounding a central axis and having a first end portion including an end face and a base oriented generally perpendicular to said axis and axially spaced from said end face an outer wall and an inner wall extending axially from the base to respective first free ends at said end face, and a recess which is defined between the outer and inner walls and the base and opens at the end face of the core, wherein the outer wall has an inner surface which tapers continuously in a straight or curved direction radially outwardly from said base to the first free end of the outer wall structure to form a narrowed edge at the first free end of the outer wall; and an end cap bonded to the filter at the first end portion of the filter, wherein solidified bonding material is disposed in the recess of the core.

24. The filter element of claim 23 wherein the filter has an inner diameter and wherein the outer wall has a generally continuous outer surface which contacts filter.

25. The filter element of claim 24 wherein the outer wall has a generally continuous inner surface and the inner wall has a generally continuous outer surface the recess comprising a groove disposed between the inner surface of the outer wall and the outer surface of the inner wall.

26. The filter element of claim 23 wherein the outer wall has a generally continuous inner surface and the inner wall has a generally continuous outer surface, the recess comprising a groove disposed between the inner surface of the outer wall and the outer surface of the inner wall.

27. The filter element of claim 23 wherein the first end portion of the core includes a vent communicating the recess.

28. The filter element of claim 19 or 23 wherein the recess has a V-shaped configuration and the base is at the intersection of the inner and outer walls.

29. The filter element of claim 23, wherein the filter has an inner diameter, wherein the first end portion of the core has a first end and wherein the outer wall contacts the filter and the inner surface is generally continuous and tapers from the edge away from the outer surface.

* * * * *